(12) United States Patent
Crowhurst

(10) Patent No.: US 10,628,191 B2
(45) Date of Patent: *Apr. 21, 2020

(54) PERFORMANCE-BASED TESTING SYSTEM AND METHOD EMPLOYING EMULATION AND VIRTUALIZATION

(71) Applicant: Prometric LLC, Baltimore, MD (US)

(72) Inventor: Christopher Crowhurst, Savage, MN (US)

(73) Assignee: Prometric LLC, Baltimore, MD (US)

( * ) Notice: Subject to any disclaimer, the term of this patent is extended or adjusted under 35 U.S.C. 154(b) by 125 days.

This patent is subject to a terminal disclaimer.

(21) Appl. No.: 16/009,466

(22) Filed: Jun. 15, 2018

(65) Prior Publication Data

US 2018/0293092 A1 Oct. 11, 2018

Related U.S. Application Data

(63) Continuation of application No. 11/468,250, filed on Aug. 29, 2006, now Pat. No. 10,013,268.

(51) Int. Cl.
*G06F 9/455* (2018.01)

(52) U.S. Cl.
CPC ................ *G06F 9/45537* (2013.01)

(58) Field of Classification Search
CPC .................................................. G06F 9/45537
USPC ......................................................... 434/354
See application file for complete search history.

(56) References Cited

U.S. PATENT DOCUMENTS

| | | |
|---|---|---|
| 4,637,797 A | 1/1987 | Whitney et al. |
| 4,772,206 A | 9/1988 | Kerr et al. |
| 4,937,036 A | 6/1990 | Beard et al. |
| 5,240,419 A | 8/1993 | deGyarfas |
| 5,313,620 A | 5/1994 | Cohen et al. |
| 5,395,243 A | 3/1995 | Lubin et al. |
| 5,481,667 A | 1/1996 | Bieniek et al. |
| 5,493,658 A | 2/1996 | Chiang et al. |
| 5,577,186 A | 11/1996 | Mann et al. |
| 5,597,312 A | 1/1997 | Bloom et al. |
| 5,602,982 A | 2/1997 | Judd et al. |
| 5,689,637 A | 11/1997 | Johnson et al. |
| 5,752,036 A | 5/1998 | Nakamura et al. |
| 5,816,820 A | 10/1998 | Heinz et al. |
| 5,823,781 A | 10/1998 | Hitchcock et al. |
| 5,907,696 A | 5/1999 | Stilwell et al. |
| 6,009,256 A | 12/1999 | Tseng et al. |
| 6,219,047 B1 | 4/2001 | Bell |
| 6,308,042 B1 | 10/2001 | Marsh et al. |
| 6,341,960 B1 | 1/2002 | Frasson et al. |
| 6,347,943 B1 | 2/2002 | Fields et al. |
| 6,371,765 B1 | 4/2002 | Wall et al. |
| 6,386,882 B1 | 5/2002 | Linberg |
| 6,438,353 B1 | 8/2002 | Casey-Cholakis et al. |
| 6,692,256 B2 | 2/2004 | Chan et al. |
| 6,704,764 B1 | 3/2004 | Ottati |
| 6,732,220 B2 | 5/2004 | Babaian et al. |
| 6,766,311 B1 | 7/2004 | Wall et al. |
| 6,813,766 B2 | 11/2004 | Hay |

(Continued)

*Primary Examiner* — Thomas J Hong
(74) *Attorney, Agent, or Firm* — Miles & Stockbridge P.C.; David R. Schaffer

(57) ABSTRACT

A system permitting virtual server images to be reused and repurposed to provide for different application environments for performance-based testing by providing a plurality of virtual hard drive images.

21 Claims, 2 Drawing Sheets

(56) References Cited

U.S. PATENT DOCUMENTS

| | | |
|---|---|---|
| 6,850,953 B1 | 2/2005 | Deshpande et al. |
| 6,884,171 B2 | 4/2005 | Eck et al. |
| 6,907,569 B1 | 6/2005 | Craft |
| 6,931,366 B2 | 8/2005 | Wang et al. |
| 6,944,785 B2 | 9/2005 | Gadir et al. |
| 6,968,350 B2 | 11/2005 | Traut et al. |
| 6,978,244 B2 | 12/2005 | Rovinelli et al. |
| 6,985,937 B1 | 1/2006 | Keshav et al. |
| 7,047,498 B2 | 5/2006 | Lui et al. |
| 7,080,378 B1 | 7/2006 | Noland et al. |
| 7,089,172 B2 | 8/2006 | Lines et al. |
| 7,299,468 B2 | 11/2007 | Casey et al. |
| 7,313,793 B2 | 12/2007 | Traut et al. |
| 7,331,791 B2 | 2/2008 | Rowley et al. |
| 7,356,771 B2 | 4/2008 | Paul et al. |
| 7,506,265 B1 | 3/2009 | Traut et al. |
| 8,221,126 B2 | 7/2012 | Julia et al. |
| 2001/0049594 A1 | 12/2001 | Klevans |
| 2002/0028430 A1 | 3/2002 | Driscoll et al. |
| 2002/0031751 A1 | 3/2002 | Wen et al. |
| 2002/0082858 A1 | 6/2002 | Heddaya et al. |
| 2003/0036874 A1 | 2/2003 | Fuller et al. |
| 2003/0037316 A1 | 2/2003 | Kodosky et al. |
| 2003/0125924 A1 | 7/2003 | Lines et al. |
| 2003/0176993 A1 | 9/2003 | Lines et al. |
| 2004/0019486 A1* | 1/2004 | Wen ............... G06F 17/289 704/270 |
| 2004/0029092 A1 | 2/2004 | Orr et al. |
| 2004/0139437 A1 | 7/2004 | Amdt |
| 2004/0230970 A1 | 11/2004 | Janzen |
| 2004/0260809 A1 | 12/2004 | Yodaiken |
| 2005/0076324 A1 | 4/2005 | Lowell et al. |
| 2005/0091310 A1 | 4/2005 | Salomon |
| 2005/0228937 A1 | 10/2005 | Karr et al. |
| 2006/0004944 A1 | 1/2006 | Vij et al. |
| 2006/0070067 A1* | 3/2006 | Lowery ............ G06F 9/5027 718/100 |
| 2006/0085784 A1 | 4/2006 | Traut et al. |
| 2006/0218544 A1* | 9/2006 | Chakraborty ......... G06F 8/63 717/168 |
| 2007/0033592 A1 | 2/2007 | Roediger et al. |
| 2008/0098154 A1 | 4/2008 | Traut et al. |

\* cited by examiner

PERFORMANCE-BASED TESTING SYSTEM AND METHOD EMPLOYING EMULATION AND VIRTUALIZATION

CROSS REFERENCE TO RELATED APPLICATIONS

This application is a continuation of U.S. patent application Ser. No. 11/468,250, filed on Aug. 29, 2006, the contents of which are incorporated herein by reference in their entirety.

TECHNICAL FIELD

The present invention generally relates to a performance-based testing computer system and method utilizing emulation and virtualization techniques to allow for extemporaneous selection of differing scenarios for adjudging the skill of users with respect to one or more application programs.

BACKGROUND

Performance-based testing, or "cPBT," is an examination approach wherein candidates must interact with real or simulated systems. PBT puts the test taker in one or more situations wherein the test taker must use his or her knowledge, demonstrate his or her skills, solve common problems and/or perform troubleshooting tasks, which are believed by the test crafter to correlate with the specialized knowledge and skill needed for performing certain tasks and activities. PBT is used in many industries and professions to test competency. For example, firemen, police officers, airline pilots, and flight deck crew are often tested using performance-based testing. If their test scores fall below key performance indicators, they are sent back to training or otherwise taken off the job.

PBT may take the form of interactive software simulation, wherein test items simulate the behavior of a particular software product and in the context of the simulation, the test taker is asked to perform specified functions correctly within the simulation. Interactive software simulation is a particularly useful strategy for gauging proficiency in the utilization of computer software programs. Unlike computer-based training ("CBT") which moves a user linearly through a course of study, interactive software simulation places the user in a simulation of a computer application and asks the test taker to perform a function as if they were using real software Interactive software simulation may permit the application to be simulated without the need for the application to have special programming "hooks," and without the need for the real application to be present on the testing workstation. Such programs may be self-contained, eliminating variation between different operating systems, product versions and languages.

In an information technology intensive era, companies are looking to streamline the hiring of computer-savvy individuals. This includes assessing their educational needs.

Evaluating potential and current employees can be a costly venture if it is found after a probationary period that the employee is ill-equipped to perform the job for which he or she was hired or trained. In a highly competitive and rapidly evolving field, it is often vital that employees come to the workplace with a grasp of the abilities their jobs demand. In situations where none of the prospective candidates possess all the necessary skills and abilities, testing can indicate which candidates will require the least amount of training. It can also show whether any candidates possess the skills to begin working and whether they have a strong enough grasp of materials to pick up the remaining skills through on-the-job training.

Degrees of computer performance testing complexity can vary greatly from testing a secretary in the use of a word processor, to testing an information technology professional in complex computer system administration. Administrators of such widely varying tests must establish environments to meet the criteria of the job. In particular, the administrator must pay attention to validity and reliability issues each time a test is given.

Validity refers to proof that a test accurately measures the skill or set of skills it is intended to gauge. Methods of assessing test validity include content, construct and criterion validation. Content validity refers to proof, normally provided by subject-matter experts, that items in a test cover the most important and frequently-used knowledge, skill and abilities needed to accomplish the job being measured by the test. Construct validity refers to proof that the individual items in a test are accurate measurements of the subject being tested. Criterion validity refers to proof that the overall test accurately correlates with some other independent measure.

Reliability references the ability of the test to provide consistent, replicable information about a user's performance. Reliability is a prerequisite to validity. Reliability depends on the consistency of the simulation of the test tasks and the consistency of rating responses to the tasks. For testing agencies, accuracy, validity and reliability of their computer performance tests are major selling points.

A computer systems administrator may frequently provide a complete network system, including workstation, server, applications and documents for a PBT. Computer networks may entail connecting hubs, wiring, and software. People are needed to make the network perform to provide the platform of applications desired, such as word processing, computer aided design and the like.

Once the realm of mainframe computers, networks with multiple servers handle everything from websites, to application support, to email, and to accounting. As the need for more separation and more services has risen, more servers have been implemented to cope with the need. However the increase in equipment has brought about management headaches for administration staff to maintain every unit at the required reliability level.

Recently there has been introduced a method of employing "virtual machines," something pioneered on mainframes by companies such as IBM. So-called "virtualization" is the process of presenting a logical grouping or subset of computing resources so that they can be accessed in ways that give benefits over the original configuration. The term "virtual machine" references software that forms a virtualized environment, that is an environment which appears to a guest operating system as hardware, but is actually simulated and contained by the host system. One type of virtual machine is the VMware virtual machine by International Business Machines.

Internet hosting companies have become the primary users of virtualization. Using the abstraction of a virtual server, a hosting company can support multiple web servers on a single computer, considerably reducing their maintenance and support cost. While operating on a shared machine, virtualization may have the effect of providing complete environments with all the security of a dedicated machine, yet sharing the backup, archiving, monitoring, and related services for the system administrator.

A group of machines that have similar architecture or design specifications may be considered to be members of the same "family." Although a group of machines may be in the same family because of their similar architecture and design considerations, machines may vary widely within a family according to their clock speed and other performance parameters.

Each family of machines executes instructions that are unique to the family. The collective set of instructions that a particular machine or family of machines can execute is known as the machine's "instruction set." As an example, the instruction set used by the Intel 80.times.86 processor family is incompatible with the instruction set used by the PowerPC processor family.

The uniqueness of a particular family among computer systems also typically results in incompatibility among other elements of hardware architecture of other computer systems. For example, a computer system manufactured with a processor from the Intel 80.times.86 processor family will have a hardware architecture that is different from the hardware architecture of a computer system manufactured with a processor from the PowerPC processor family. Because of the uniqueness of the machine's instruction set and a computer system's hardware architecture, application software programs are typically written to run on a particular computer system running a particular operating system.

To expand the number of operating systems and application programs that can run on a particular computer system, a field of technology has developed in which a given computer having one type of central processing unit ("CPU") called a host, will include a software and/or hardware-based emulator that allows the host computer to emulate the instruction set of an unrelated type of CPU, called a guest. Thus, the host computer will execute an application that will cause one or more host instructions to be called in response to a given guest instruction. Therefore, the host computer can both run software designed for its own hardware architecture and software written for a computer having an unrelated hardware architecture.

Typically, an emulator is divided into modules that correspond roughly to the emulated computer's subsystems. Most often, an emulator will be composed of the following modules: a CPU emulator or CPU simulator (the two terms are often interchangeable); a memory subsystem module; and various IFO devices emulators. Generally, buses are often not emulated, either for reasons of performance or simplicity, and virtual peripherals communicate directly with the CPU or the memory subsystem.

The CPU simulator is often the most complicated part of an emulator. Many emulators are written using "pre-packaged" CPU simulators in order to concentrate on good and efficient emulation of a specific machine. The simplest form of a CPU simulator is an interpreter, which follows the execution flow of the emulated program code and, for every machine code instruction encountered, executes operations on the host processor that are semantically equivalent to the original instructions.

When a guest computer system is emulated on a host computer system, the guest computer system is said to be a virtual machine, as the guest computer system exists only as a software representation of the operation of the hardware architecture in the host computer system. The terms "emulator" and "virtual machine" are sometimes used interchangeably to denote the ability to mimic or emulate the hardware architecture of an entire computer system. "Emulation" thus references a complete form of a virtual machine in which the complete hardware architecture is duplicated.

Unlike "simulation," which only attempts to reproduce a program's behavior, "emulation" attempts to model the state of the device being emulated. An emulator program that executes an application on the operating system software and hardware architecture of the host computer, such as a computer system having a PowerPC processor, mimics the operation of the entire guest computer system. The emulator program acts as the interchange between the hardware architecture of the host machine and the instructions transmitted by the software running within the emulated environment of the guest computer system. Emulations are used throughout the network industry to test new software rollouts prior to full implementation.

Administrators presently secure a server state by regular backups. In the event a failure of the system occurs, the administrator can bring the system back online with minor delays. An even more intensive task in the practice of backups is taking an "image" of an environment, such as a disk drive. An image is a computer file containing the complete contents and structure of a data storage medium or device. Images have an advantage in that in the event of a failure of the environment the structure would not have to be duplicated. The image file containing the structure negates the need to do so, thus decreasing the time to restore or build up a drive or environment.

Emulated computer systems typically involve the use of a virtual hard drive image. To emulate the presence of a physical hard drive for the guest operating system, the emulation program creates a virtual hard drive image. The emulation program will present the virtual hard drive image to the guest operating system. The guest operating system will boot from the virtual hard drive image and will refer to the virtual hard drive image for all other functions necessitating reading from or writing to a hard drive. The virtual hard drive image often exists as a single file on the physical hard drive of the computer system. Thus, the entire contents of the virtual hard drive of the guest computer system are represented as a single file on the physical hard drive of the host computer system.

In present computer performance testing administrators must manually create not only the test itself, but also the environment. Typically such tests are set up on multiple computers in a network system. For every possible scenario, there must be a method to present the test in a uniform manner and archive the test such that it can be given at a later time without undue burden on the system administrators. In some cases, test providers may need several hundred examples of suitable tests to sample from. Typically they seek a straightforward and manageable means to provide such tests. Having system administrators configure and reconfigure test platforms is onerous especially in light of the requirements for better return on company investments. All of this may be very costly.

Computer performance-based testing, as compared to multiple choice format testing, may also be more costly in that it may require significantly more time in the evaluation of the appropriateness of a response. While scoring of the examination may be designed to provide somewhat granular and discrete answers, distinctly right or wrong answers are typically much less common than on a multiple choice test as a result of the multiple correct routes to respond to a proposed scenario available on performance-based tests.

There is a need for improved computer performance-based testing methods that do not require the set-up of numerous stand-alone computers or a pervasive need for system administrators to configure and reconfigure test platforms on a network system. Further, there is a need for computer performance-based testing methods which allow for extemporaneous administration of tests depending on the test taker designated to take the test. In addition, there is a need for new methods to improve the granularity of performance-based tests in order to more adequately assess the skills of the person being tested.

SUMMARY

Embodiments of the present invention provide a performance-based testing system and method employing emulation and virtualization.

In one embodiment, a system includes a memory and a processor.

The memory stores a plurality of application image files and a plurality of virtual hard drive image files. Each application image file includes an executable software program. Each virtual hard drive image file includes a different scenario associated with an executable software program. Each scenario measures the proficiency of a test taker in using the associated software program.

The processor is coupled to a network, and hosts a plurality of virtual servers. Each virtual server is configured to receive, from an administrator workstation over the network, a selection of an application image file from the plurality of application image files, randomly select a virtual hard drive image file, having a scenario associated with the software program in the selected application image file, from the plurality of virtual hard drive image files, and execute the software program in the selected application image file, in cooperation with the selected virtual hard drive image file, to provide the scenario to a test taker workstation over the network.

DETAILED DESCRIPTION

The demonstration of the knowledge of certain facts in a test does not equate with the ability of the test taker to apply that knowledge in a meaning way. In order to more appropriately adjudge learning and understanding, it has been suggested that performance-based testing be employed. One type of performance-based testing is interactive computer simulation, wherein test items simulate the behavior of a particular software product and ask the user to perform a specified function correctly within that simulation.

A problem associated with interactive computer simulation is that it may be desirable that the test taker demonstrate efficiency with respect to a number of software products not designed to run on the same operating system. Testing of skill in using each of these products in the past might require the employment of a number of different computers. Recently, however, emulation strategies have been developed in the computing environment which allows one of more disparate family software programs to be run on a common piece of hardware.

Figure 2:
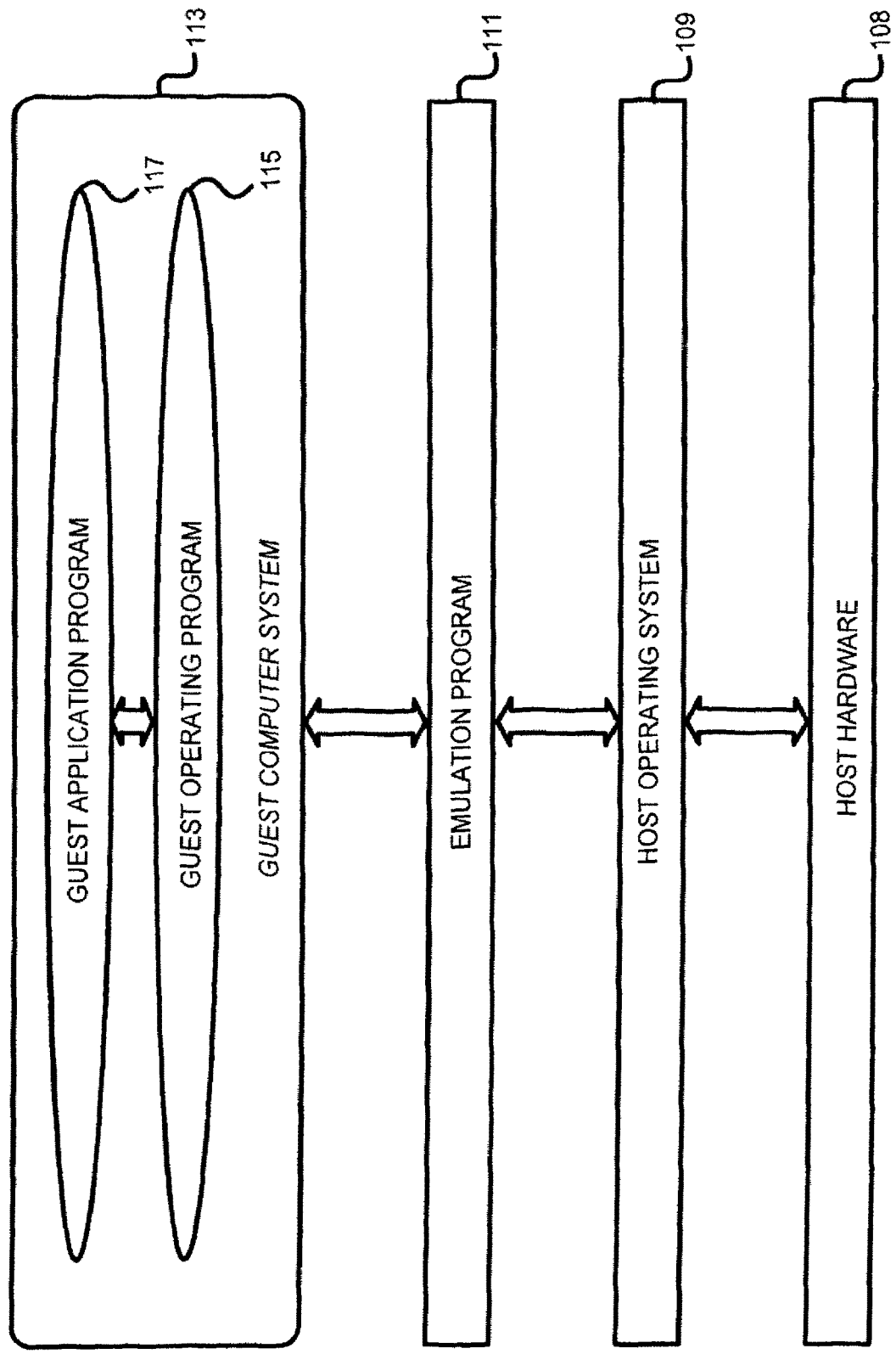
FIG. 2 is a diagram of the logical layers of the hardware and software architecture for an emulated operating environment in computer system.

FIG. 2 illustrates a diagram of the logical layers of the hardware and software architecture for an exemplary conventional emulated operating environment in computer system 107. Emulation program 111 runs on host operating system 109 and host hardware architecture 108. Emulation program 111 emulates guest computer system 113, including guest operating system 115. Guest software application 117 runs on guest operating system 115. In the emulated operating environment of FIG. 2, because of the operation of emulation program 111, guest software application 117 can run on computer system 107 even though guest software application 117 might be designed to run on an operating system that may be generally incompatible with host operating system 109 and host hardware architecture 108.

Such emulation strategies allow for a single piece of hardware, such as a server, to be segregated so as to permit the running of software applications on the common hardware although such applications are normally only executable using a different operating system.

In embodiments of the present invention, emulation strategies are employed to permit individual test takers to be challenged with a number of different software applications irrespectively of the operating system for which they were configured. Such system, for example, would allow a test taker to be tested on his or her skills with Macintosh drawing programs as well as Microsoft Word. However, it is recognized herein that segregation of a server into a number of stand alone virtual servers in itself does not overcome the problem faced by administrators of performance-based tests in having to constantly update and reformat testing to assure that subsequent test takers do not learn from previous test takers.

To overcome such problem, in one embodiment there is provided a number of virtual hard drive images, each of which is directed to a different scenario executable by an application hosted by the virtual server. Such virtual hard drive images can be used by the virtual server image to recreate different application environments, and to proffer different test takers different data within the same application. By changing out the different virtual hard drive image the virtual server image can be reused and re-purposed dramatically reducing the cost to develop performance-based assessment scenarios.

For example, a test taker seeking to show his or her abilities with respect to Visio, or another proprietary drawing program, may be asked to prepare certain charts or drawings. If the test taker is seeking employment in the marketing department of an electrical engineering company, the virtual hard drive image associated with the program may be selected from one or more virtual hard drive images that propose a scenario that requires the test taker to demonstrate proficiency in importing drawings or preparing flow charts. If the test taker is seeking employment as an electrical engineer, the virtual hard drive image for testing purposes may be selected from one or more virtual hard drive images proposing a scenario that requires the test taker to prepare a electric circuit diagram. In each case, the test taker is tested with respect to the test taker's abilities with the drawing program, but each is faced with real-life scenarios that are important to their anticipated tasks at the company.

In one embodiment, the particular virtual hard drive image selected for testing purposes of the application may be in whole or in part selected at random. For example, one test taker electrical engineer may be faced with the task of computer drafting one type of electrical circuit, while another may be faced with the task of computer drafting another type of electrical circuit. The initial selection of virtual hard drive images may be selected in a directed fashion (e.g., an electrical circuit diagram scenario); however, the final selection of which virtual hard drive image is presented to any particular test taker used may be at random. Randomization is useful in preventing one test taker from affecting the response of another test taker, at the time of the test, or at a later date.

The scenario presented to a test taker may be in the form of a series of commands or requests for the test taker to perform. For example, the test taker may be requested to use a software program to determine the stresses and strains on a particular engineered structure, to resolve an IT problem indicated by the scenario to have occurred, or to summarize data necessary to resolve a scenario.

In one embodiment there is provided a software program which automatically grades a test taker's responses to a given PBT. Such program is configured to compare responses (keystrokes, etc,) against a library of responses, each of which has been given a pre-determined point grade value. Such library of responses may be compiled from prior responses or may be actively compiled as a test taker takes the PBT (with appropriate "grading" added thereafter). If a response of a test taker is not found in the library, manual grading may be required.

Figure 1:
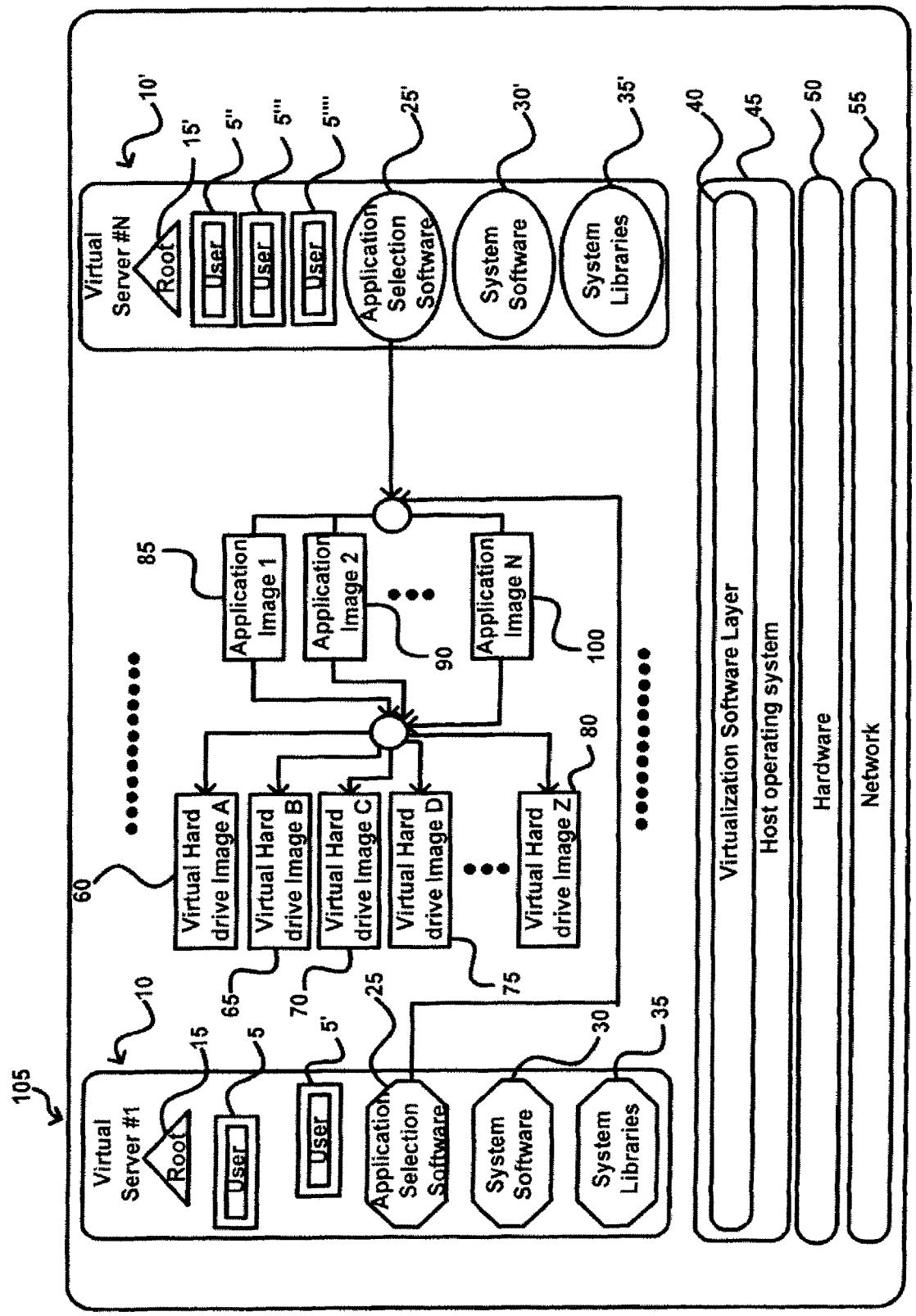
FIG. 1 illustrates in diagrammatic form an exemplary system server of the present invention.

Now turning to FIG. 1, there is shown an exemplary embodiment system server 105 of the present disclosure. Such system server 105 comprises a server partitioned into a number of virtual servers, e.g., virtual server no. 1 (10) to virtual server no. N (10'). Each virtual server may have one or more users (5, 5', 5", 5'", and 5"") that are authorized to have root (15, 15') access to the virtual server. Each virtual server may be designed to emulate different system software (30, 30') which may make use of different system libraries (35, 35'). System libraries (35, 35') may comprise a collection of precompiled routines that system software (30, 30') may uses and which allow linkage to a number of programs.

System server 105 comprises a virtualization software layer 40 which permits creation and execution of different virtual servers (10 to 10') on the server. System server 105 runs on its own host operating system 45, which may be distinct from the virtual server environments. System server 105 comprises both software and hardware (50) components, and typically is run in a network environment (55) allowing for access by multiple workstations simultaneously.

Each virtual server (10 to 10') is operatively configured to allow for section of among a plurality of application images (85/90 to 100) and a plurality of virtual hard drive images (60, 65, 70, 75 to 80) to permit a user (5, 5', 5', 5"', and 5"") to allow for different scenarios with respect to any application program for various test takers based upon the selection of the virtual server (10 to 10'), application image (85/90 to 100) and virtual hard drive image (60, 65, 70, 75 to 80) selected. Virtual hard drive image (60, 65, 70, 75 to 80) may be selected randomly, in whole or in part, to provide for differing scenarios being tendered to test takers on a random basis. By randomly changing the scenario with which a test taker may be confronted, the test taker is not allowed to cheat or rotely learn to pass the test.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A system for providing performance-based tests, comprising:
   a memory storing a plurality of application image files and a plurality of virtual hard drive image files, each application image file including an executable software program, each virtual hard drive image file including a different scenario associated with an executable software program, each scenario measuring the proficiency of a test taker in using the associated software program; and
   a processor, coupled to a network, for hosting a plurality of virtual servers, each virtual server being configured to:
      receive, from an administrator workstation over the network, a selection of an application image file from the plurality of application image files,
      randomly select a virtual hard drive image file, having a scenario associated with the software program in the selected application image file, from the plurality of virtual hard drive image files, and
      execute the software program in the selected application image file, in cooperation with the selected virtual hard drive image file, to provide the scenario to a test taker workstation over the network.

2. The system of claim 1, wherein each virtual server includes an emulator to emulate an operating system.

3. The system of claim 2, wherein each virtual server includes operating system libraries associated with the emulated operating system.

4. The system of claim 2, wherein said emulator includes a software emulator.

5. The system of claim 2, wherein said emulator includes a hardware emulator.

6. The system of claim 2, wherein said emulator includes a hardware emulator and a software emulator.

7. The system of claim 2, wherein each virtual server emulates a different operating system.

8. A method for providing a performance-based test, comprising:
   storing, in a memory, a plurality of application image files and a plurality of virtual hard drive image files, each application image file including an executable software program, each virtual hard drive image file including a different scenario associated with an executable software program, each scenario measuring the proficiency of a test taker in using the associated software program;
   hosting a plurality of virtual servers, each virtual server being configured to emulate an operating system;
   receiving, from an administrator workstation over a network, a selection of an application image file from the plurality of application image files;
   randomly selecting a virtual hard drive image file, having a scenario associated with the software program in the selected application image file, from the plurality of virtual hard drive image files; and
   executing, by one of the plurality of virtual servers, the software program in the selected application image file, in cooperation with the selected virtual hard drive image file, to provide the scenario to a test taker workstation.

9. The method of claim 8, wherein each virtual server includes an emulator to emulate an operating system.

10. The method of claim 9, wherein each virtual server includes operating system libraries associated with the emulated operating system.

11. The method of claim 9, wherein said emulator includes a software emulator.

12. The method of claim 9, wherein said emulator includes a hardware emulator.

13. The method of claim 9, wherein said emulator includes a hardware emulator and a software emulator.

14. The method of claim 9, wherein each virtual server emulates a different operating system.

15. A non-transitory computer-readable medium storing instructions that, when executed by a processor, provide different performance based tests to a test taker, said providing comprising:
   storing, in a memory, a plurality of application image files and a plurality of virtual hard drive image files, each application image file including an executable software program, each virtual hard drive image file including a different scenario associated with an executable software program, each scenario measuring the proficiency of a test taker in using the associated software program;
   hosting a plurality of virtual servers, each virtual server being configured to emulate an operating system;
   receiving, from an administrator workstation over a network, a selection of an application image file from the plurality of application image files;
   randomly selecting a virtual hard drive image file, having a scenario associated with the software program in the selected application image file, from the plurality of virtual hard drive image files; and
   executing, by one of the plurality of virtual servers, the software program in the selected application image file, in cooperation with the selected virtual hard drive image file, to provide the scenario to a test taker workstation.

16. The non-transitory computer-readable medium of claim 15, wherein each virtual server includes an emulator to emulate an operating system.

17. The non-transitory computer-readable medium of claim 16 wherein each virtual server includes operating system libraries associated with the emulated operating system.

18. The non-transitory computer-readable medium of claim 16, wherein said emulator includes a software emulator.

19. The non-transitory computer-readable medium of claim 16, wherein said emulator includes a hardware emulator.

20. The non-transitory computer-readable medium of claim 16, wherein said emulator includes a hardware emulator and a software emulator.

21. The non-transitory computer-readable medium of claim 16, wherein each virtual server emulates a different operating system.

\* \* \* \* \*